United States Patent
McLaughlin

(10) Patent No.: US 10,582,268 B2
(45) Date of Patent: Mar. 3, 2020

(54) SYSTEM AND METHOD FOR SYNCHRONIZATION OF AUDIO AND CLOSED CAPTIONING

(71) Applicant: Philip T. McLaughlin, St. James, NY (US)

(72) Inventor: Philip T. McLaughlin, St. James, NY (US)

(*) Notice: Subject to any disclaimer, the term of this patent is extended or adjusted under 35 U.S.C. 154(b) by 0 days.

(21) Appl. No.: 15/088,264

(22) Filed: Apr. 1, 2016

(65) Prior Publication Data
US 2016/0295293 A1 Oct. 6, 2016

Related U.S. Application Data

(60) Provisional application No. 62/142,699, filed on Apr. 3, 2015.

(51) Int. Cl.
| | |
|---|---|
| H04N 5/445 | (2011.01) |
| H04N 21/488 | (2011.01) |
| H04N 21/242 | (2011.01) |
| H04N 21/43 | (2011.01) |
| H04N 21/44 | (2011.01) |
| H04N 21/234 | (2011.01) |
| H04N 21/236 | (2011.01) |

(52) U.S. Cl.
CPC ... *H04N 21/4884* (2013.01); *H04N 21/23406* (2013.01); *H04N 21/23424* (2013.01); *H04N 21/23614* (2013.01); *H04N 21/242* (2013.01); *H04N 21/4302* (2013.01); *H04N 21/44004* (2013.01)

(58) Field of Classification Search
CPC ......... H04N 21/4884; H04N 21/23424; H04N 21/242
USPC ...................................... 725/47–52
See application file for complete search history.

(56) References Cited

U.S. PATENT DOCUMENTS

| | | | | |
|---|---|---|---|---|
| 6,490,553 | B2* | 12/2002 | Van Thong | H04N 5/278 348/E5.06 |
| 7,139,031 | B1* | 11/2006 | Bray | H04N 5/23241 348/468 |
| 2003/0223466 | A1* | 12/2003 | Noronha, Jr. | H04N 21/226 370/537 |
| 2009/0024922 | A1* | 1/2009 | Markowitz | G11B 27/10 715/716 |
| 2009/0185074 | A1* | 7/2009 | Streijl | H04N 7/0885 348/468 |
| 2010/0175082 | A1* | 7/2010 | Blumenschein | G06Q 30/02 725/32 |
| 2010/0194979 | A1* | 8/2010 | Blumenschein | G06F 17/289 348/468 |
| 2012/0176540 | A1* | 7/2012 | Labrozzi | H04N 21/4312 348/468 |
| 2014/0300813 | A1* | 10/2014 | Kellicker | H04N 7/0882 348/468 |

* cited by examiner

*Primary Examiner* — Pankaj Kumar
*Assistant Examiner* — Sahar Aqil Riaz
(74) *Attorney, Agent, or Firm* — Hoffmann & Baron, LLP

(57) ABSTRACT

A system and method for synchronizing audio from a program source with closed captioning data includes a caption encoder having a video-audio delay line. The caption encoder with the delay line is adapted to delay the programming source by a settable amount of time so that the program audio can be synchronized with closed caption data received from a remote live captioner.

14 Claims, 2 Drawing Sheets

SYSTEM AND METHOD FOR SYNCHRONIZATION OF AUDIO AND CLOSED CAPTIONING

This application claims priority to U.S. Provisional Application Ser. No. 62/142,699 filed on Apr. 3, 2015, the disclosure of which is incorporated herein by reference in its entirety.

FIELD OF INVENTION

The invention relates to the creation and insertion of live closed caption services for broadcast or video streaming applications which solves the problem of caption authoring latency using a smart encoder which can output delayed audio/video with synchronized captions.

BACKGROUND

In production of live or near-to-air programming captions are authored by transcriptionists (captioners) that listen to the program audio and enter text and formatting commands using some means of live text entry. These methods of low latency real time text entry include stenographic keyboards and specialized voice recognition software. When voice recognition methodologies are used the transcriptionist is generally required to re-speak the dialogue and descriptions of non-verbal sounds present in the program audio. As most captioners work from locations that are remote to the origination site of the live programming, it is necessary to provide a private audio feed to the captioner. This audio feed can be a telephone line or preferably a higher quality feed streamed via the Internet. A latency of 4 to 6 seconds in the display of caption text as related to the program audio is directly attributable to the time required by the captioner (transcriptionist) to interpret the audio and enter the appropriate caption text. This latency is present regardless of the particular method of data entry employed. This latency seriously degrades the usefulness of the captioning service. Additionally, since the closed caption data is 4 to 6 seconds delayed from the program video and audio in live programming, there has been no satisfactory way to splice program segments that are produced live, with post produced segments (e.g. commercials) that contain properly synchronized captions. In the case of such a splice either the last 4 to 6 seconds of the live captions must be discarded or the first 4 to 6 seconds of the commercial or other post produced content is dropped. Neither of these approaches is acceptable. What is needed is a new apparatus for live closed caption production that eliminates the inherent latency of live captions while preserving the correct timing of pre-authored upstream captions.

SUMMARY

The present invention is system for synchronization of program source audio and closed captioning including means for extracting and streaming program audio from a program source, a program source video/audio delay means, a closed caption data delay line wherein the delay can be varied, a closed caption data encoder which outputs closed caption data, and means for switching a source of caption data to the closed caption data encoder. The switching means is responsive to a content of caption data embedded in the program source and a source of caption data provided by a remote captioner to synchronize the caption data with the streaming program audio. The means for extracting and streaming program audio from a program source may be software and/or firmware. The video/audio delay means is preferably in the form of software and/or programmable logic devices which can delay a video/audio signal by a user settable length of time. For example, the video/audio delay means may include a field programmable gate array (FPGA). In one embodiment, the closed caption data delay line includes software adapted to set a delay having a user settable length of time. The means for switching a source of caption data may include at least one multiplexer which provides an output of a delayed video/audio signal with synchronized captions.

Furthermore, the program source may include a master video input and an auxiliary video input, wherein the master video input is a delayed copy of the video being fed on the auxiliary video input. Preferably, the delay between the master video input and auxiliary video input approximates the delay of real-time captioning. The switching means is adapted to adjust the caption data timing according to the master video input delay to provide a master output having delayed audio/video with synchronized captions.

The present invention is also directed to a method of synchronizing caption data with a program source having video and audio by inputting the program source to a caption encoder, inputting caption data into the caption encoder, the caption encoder including a variable length time delay buffer adapted to delay the caption data and a program source delay means for delaying the video and audio of the program source, delaying the program source by a user settable amount of time, delaying the caption data by use of the variable length time delay buffer, and inserting the delayed caption data into the delayed program source to synchronize the caption data with the video and audio in the program source. The program source delay means may be in the form of software and/or firmware. In one embodiment, before the step of inputting caption data, it is preferable to determine a caption data source to determine if the caption data is embedded in the program source or provided by a remote captioner and thereafter provide the determination to the variable length time delay buffer to allow the caption data to be synchronized with the program source audio.

Before the embodiments of the invention are explained in detail with reference to the figures, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DESCRIPTION OF INVENTION

The present invention is an apparatus and method for live closed caption production which solves the problem of caption authoring latency by combining a means for extracting and streaming program audio from a source of programming, a video/audio delay means, a closed caption data delay line whose delay can be varied responsive to control parameters received from the remote captioner or determined by synchronizing received caption data to the program audio to determine the amount of pre-correction latency, a closed caption data encoder, and a means for switching the source of caption data responsive to the content of the caption data embedded in the program source and the source of caption data provided by the remote captioner to the internal closed caption data encoder. This new apparatus, preferably in the form of a single unit, provides excellent synchronization of caption text to program audio and eliminates the loss of caption text when switching between live and post produced programming.

While the making and using of various embodiments of the present invention are discussed in detail below, it should be appreciated that the present invention provides many applicable inventive concepts which can be embodied in a wide variety of designs. The specific embodiments discussed herein are merely illustrative of specific ways to make and use the invention and various aspects of the invention, and do not limit the scope of the present invention.

Figure 1:
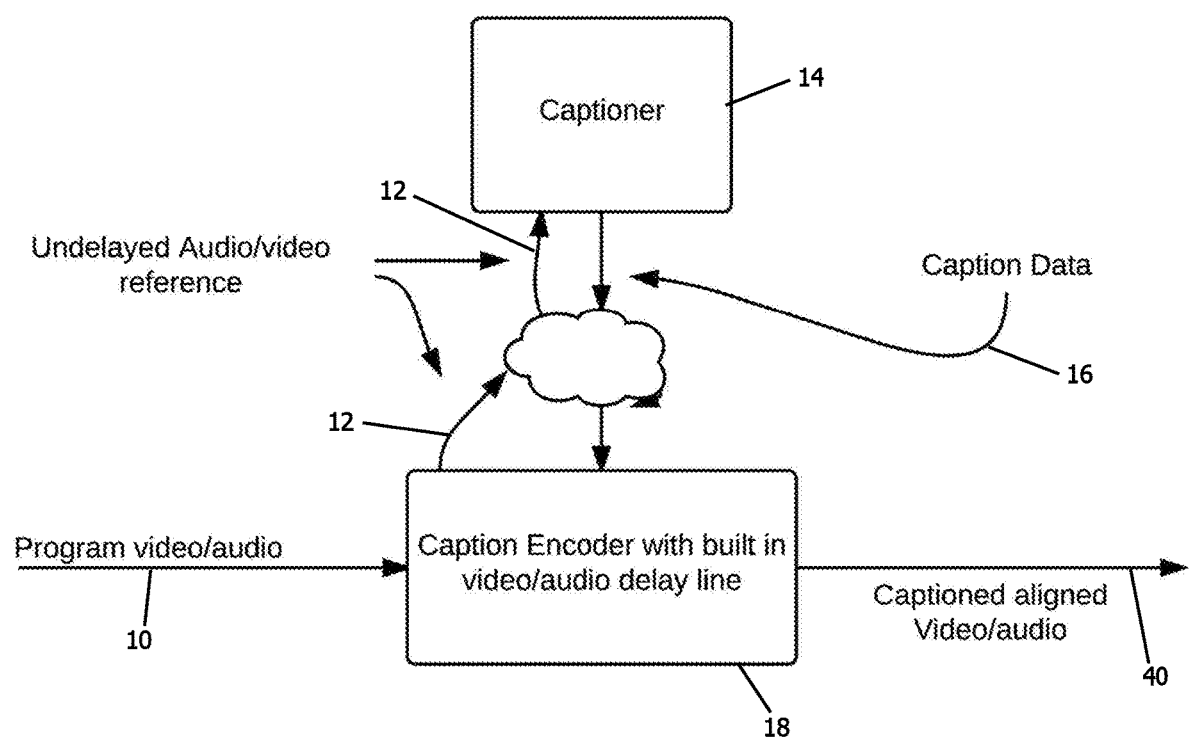
FIG. 1 is a block diagram illustrating a system to synchronize program source video/audio with closed captioning data.
Figure 2:
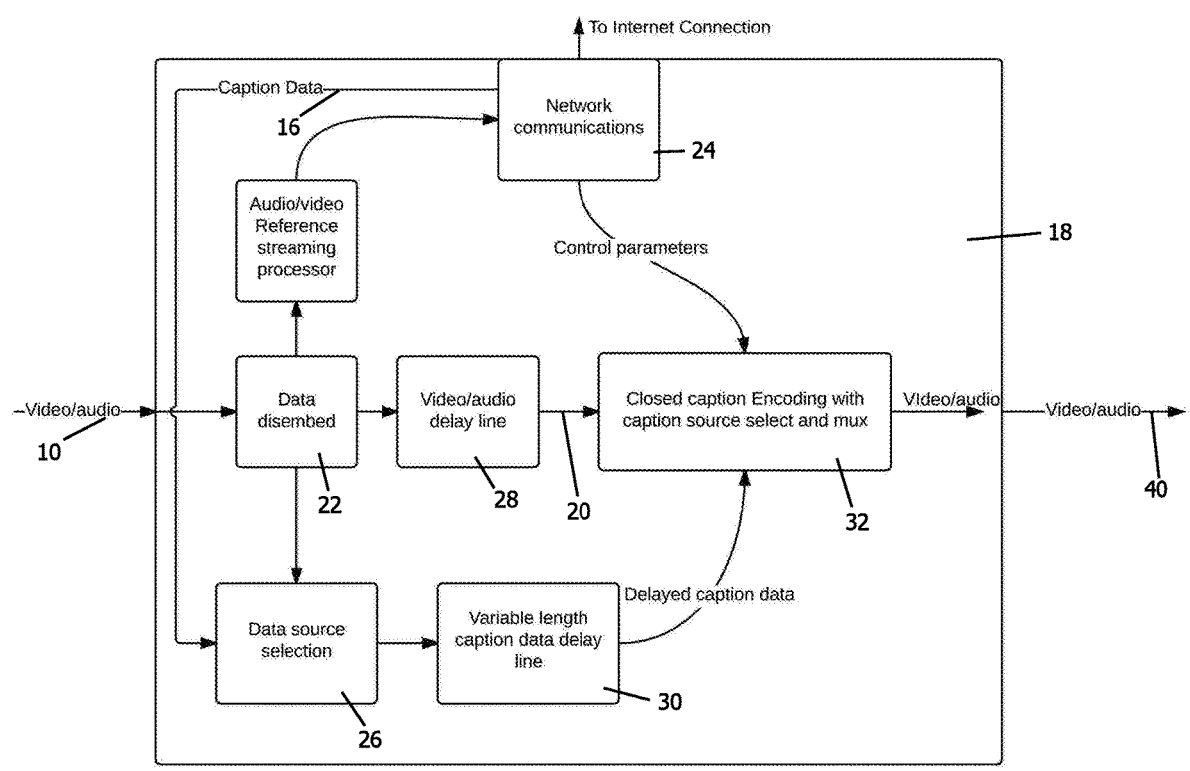
FIG. 2 is a block diagram illustrating the caption encoder shown in FIG. 1.

As shown in FIGS. 1 and 2, in use, program audio 12 extracted from the programming source 10 is provided to the remote captioner 14 who subsequently authors caption data 16 that is sent back to a caption encoder 18 with a built-in video-audio delay line. The caption encoder 18 delays the programming source and provides a program output 20 that is delayed, for example, by a user settable time in the range of approximately 4 to 6 seconds. The closed caption data 16 received from the live captioner 14 (or caption encoding process such as an automatic voice recognition systems) is placed into a variable length time delay buffer preferably built into the caption encoder 18. The length of this delay is determined by one of a number of methods. In one embodiment, the delay is set by the captioner or captioning process to a fixed value that is indicative of the average transcription delay of the captioner or captioning process. The delay value parameter may be supplied over the network communications link 24 from the captioner or captioning process to the caption encoder 18. In another embodiment, the caption delay buffer length is dynamically adjusted during the provision of captioning by various methods. One method would use output metadata from a voice recognition system that marks its output text with time stamps indicating the location of the audio instant that resulted in the production of the particular element of text. Another source of the caption buffer delay parameter would use a closed caption to audio synchronization determination as is known in the art.

As shown in FIG. 2, caption encoder 18 receives input program source 10 which is input into a data disembed or separator 22. The data disembed 22 may be in the form of software and/or firmware. The audio signal which has been separated from the program source 10 is streamed to a network communications device 24 which is connected via the Internet to a remote captioner 14 as shown in FIG. 1. The remote captioner 14 returns caption data 16 to the network communications device 24. The caption data 16 is output from the network communications device 24 and input into a caption data source selector 26 which can, for example, via a multiplexer, determine the source of the caption data. The caption data source selector 26 is adapted to determine whether the caption data is embedded in the program source or provided by a remote captioner and thereby being delayed. If the caption data is embedded in the program source, this information is input into the caption data source selector 26 from the data disembed 22 as shown in FIG. 2. The data disembed 22 also outputs to the input of a program source video/audio delay line 28. The program source video/audio delay line 28 may take the form of software and/or programmable logic devices which can delay a video/audio signal by a user settable length of time. In one embodiment, the program source video/audio delay line 28 may include a field programmable gate array (FPGA).

The output of the caption data source selector 26 is input into a variable length caption data delay line 30 which may be in the form of software to set a length of delay. Based upon the information received from the caption data source selector 26, the variable length caption data delay line can delay or not delay and can select the amount of time to delay. The output of the variable length caption data delay line 30 is input along with the output from the program source video/audio delay line 28 to a synchronizer 32. The synchronizer 32, based upon the input from the variable length caption data delay line 30 and program source video/audio delay line 28, synchronizes the delays to output a video/audio signal 40 which includes synchronized caption data by examination of the control codes contained in the upstream closed caption stream and the caption data 16 provided by the captioner. The caption data source selector 26 instantaneously chooses a source of caption data and inserts the appropriate closed caption data from the output of the adjustable, variable length caption delay line 30 into the post delay program output. Since the caption data source selector 26 is capable of examining the pre-delay closed caption data in real time, it can ensure that the transitions between live captioned and pre-captioned content maintain the integrity of captions. This can be accomplished by subtle and unobservable changes to the timing of the captions inserted by the device. For example, the upstream captions or the live inserted captions can be held off for a few fractions of a second when necessary and then allowed to speed up subtly to fall back into sync. This operation in normal application would be virtually undetectable to the viewer.

Referring to FIGS. 1 and 2, a variable amount of authoring delay up to the total fixed delay of the internal video/audio delay line of caption encoder 18 can be used when a source of data is available indicating the level of latency of the caption data source. This data can be derived by direct measurement of the audio and captioning synchronization, by external inputs to the caption encoder 18 such as broadcast automation systems, or by caption latency metadata provided as part of the caption data source to the caption encoder 18. This caption data source latency metadata could be supplied by the remote captioner as an approximation of authoring latency or could be directly measured from correlation between measurements taken from the program audio and the authored caption data. A simple example of caption data source latency adjustment would be the case where a captioner using a stenographic entry method might have an authoring latency of approximately 4 seconds while a captioner re-speaking into a voice recognition software application might have a mean latency of 6 seconds. The respective captioners could set nominal latency values that would be interpreted by the caption encoder 18 to compensate for their respective latencies. The adjustable insertion latency mechanism of the caption encoder 18 could be used to automatically compensate for this latency difference even within the same program block. The caption data is corrected for any determined level of latency up to the fixed delay of the internal video/audio delay line using, e.g., the variable closed caption data delay buffer described previously.

Another application of the device is to automatically adjust the timing of an upstream captioned program source. In this application, the same configuration described above is used absent the data feed from the remote captioner. The closed caption data embedded in the upstream program source is examined by the caption encoder 18 using a caption data source selector 26 to determine if the data was sourced from a live captioner or from a post produced (and thereby synchronously captioned) source. Means of determination would include whether the caption style is "roll-up" that is generally used for live captioning or "pop-on" that is universally used for post produced programming. Other means for signaling the synchronization of the captioning include metadata inserted into the program source describing its level of synchronization or control signals from broadcast automation systems signaling live program sources. It is also envisioned that the degree of synchronization between the caption data could be determined using closed caption to audio synchronization techniques such as those known in the art. At times when the caption data source selector 26 has determined that the upstream closed caption data was sourced live, the data extracted from the pre-delay program source is directly inserted into the delayed program output of the caption encoder, thereby eliminating a fixed or variable amount of authoring delay. A variable amount of authoring delay up to the total fixed delay of the internal video/audio delay element can be used when a source of data is available indicating the level of latency of the caption source. This data can be derived by direct measurement of the audio and caption synchronization, by external inputs to the caption encoder 18 such as broadcast automation systems, or by caption latency metadata embedded in the program source. Such caption latency metadata could be inserted by the closed caption encoding device that inserted the caption data. When the device by various means determines that the caption data is already synchronous, the data is inserted back into the program at its original timing. The caption data can be corrected for any determined level of latency up to the fixed delay of the internal video/audio delay line by inserting the closed caption data at the appropriate point in the video/audio delay line.

Note that in lieu of a separate closed caption data delay buffer, the closed caption data could be inserted at a parametrically adjustable point in the fixed video/audio delay line thereby achieving the same result. This alternate embodiment is applicable to both the live captioning and upstream caption correction models described above.

In a further embodiment, the program source input to the caption encoder 18 may include a master video input and an auxiliary input such that the master video input is a delayed copy of the video being fed on the auxiliary video input. Preferably, the delay between the master video input and auxiliary video input approximates the delay of real-time captioning. The caption encoder 18 is adapted to adjust the caption data timing according to the master video input delay to provide a master output having delayed audio/video with synchronized captions.

The present invention is also directed to a method of synchronizing caption data with a program source which includes video and audio comprising the steps of inputting the program source to a caption encoder; inputting caption data into the caption encoder, the caption encoder including a variable length time delay buffer adapted to delay the caption data and a program source delay means for delaying the video and audio of the program source; delaying the program source by a predetermined amount of time; delaying the caption data by use of the variable length time delay buffer; and inserting the delayed caption data into the delayed program source to synchronize the caption data with the video and audio in the program source.

In the method described above, the program source delay means may be accomplished using software and/or firmware. The method may also include, before the step of inputting caption data, determining a caption data source to determine if the caption data is embedded in the program source or provided by a remote captioner and providing the determination to the variable length time delay buffer for use in synchronizing the caption data and program source audio.

While the present disclosure has been described with reference to one or more exemplary embodiments, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the present disclosure.

What is claimed is:

1. A system for synchronization of program source audio and closed captioning comprising:
    a caption encoder configured to extract and stream program audio from a program source to a remote closed captioner;
    caption data transmitted by the remote captioner;
    a program source video/audio delay means;
    a caption data source selector to determine whether a source of caption data is (1) post produced and embedded in the program source and thereby synchronously captioned or (2) provided by a remote captioner and thereby delayed;
    a closed caption data delay line wherein delay of the caption data can be varied based upon the determination of the source of caption data by the caption data source selector;
    wherein the closed caption data encoder is configured with a synchronizer which outputs the caption data; and
    wherein based on the source of caption data to the closed caption data encoder, the synchronizer does not delay caption data which is post produced and embedded in the program source and the synchronizer delays for a selected amount of time a program source and caption data provided by the remote captioner to synchronize the caption data with the streaming program audio.

2. A system for synchronization of audio and closed captioning according to claim 1, wherein the caption encoder includes software and/or firmware to extract and stream program audio from a program source to a closed captioner.

3. A system for synchronization of audio and closed captioning according to claim 1, wherein the video/audio delay means comprises software and/or programmable logic devices which can delay a video/audio signal by a settable length of time.

4. A system for synchronization of audio and closed captioning according to claim 3, wherein the video/audio delay means comprises a field programmable gate array (FPGA).

5. A system for synchronization of audio and closed captioning according to claim 1, wherein the closed caption data delay line comprises software to set a delay time.

6. A system for synchronization of audio and closed captioning according to claim 1, wherein the synchronizer comprises at least one multiplexer.

7. A system for synchronization of audio and closed captioning according to claim 1, wherein the synchronizer provides an output of a delayed video/audio signal with synchronized captions.

8. A system for synchronization of audio and closed captioning according to claim 1, wherein the program source comprises a master video input and an auxiliary video input, wherein the master video input is a delayed copy of the video being fed on the auxiliary video input.

9. A system for synchronization of audio and closed captioning according to claim 8, wherein delay between the master video input and auxiliary video input approximates delay of the caption data.

10. A system for synchronization of audio and closed captioning according to claim 9, wherein the closed caption data encoder adjusts the caption data timing according to the master video input delay to provide a master output having delayed audio/video with synchronized captions.

11. A method of synchronizing caption data with a program source including video and audio comprising the steps of:
    inputting the program source to a caption encoder;
    inputting caption data into the caption encoder, the caption encoder including a variable length time delay buffer adapted to delay the caption data and a program source delay means for delaying the video and audio of the program source, the caption encoder further including a caption data source selector to determine whether the input caption data is (1) post produced and embedded in the program source and thereby synchronously captioned or (2) provided by a remote captioner and thereby delayed,
    delaying the program source by a settable amount of time when the input caption data is provided by a remote captioner;
    delaying the caption data by use of the variable length time delay buffer; and
    inserting the delayed caption data into the delayed program source to synchronize the caption data with the video and audio in the program source and wherein if the caption data is post produced and embedded in the program source, the program source and caption data are not delayed.

12. A method of synchronizing caption data with a program source including video and audio according to claim 11, wherein the program source delay means comprises software and/or firmware.

13. A system for synchronization of audio and closed captioning according to claim 1, wherein the caption data source selector automatically determines the source of caption data by caption style, metadata inserted into the program source, or control signals signaling live program sources.

14. A method of synchronizing caption data with a program source including video and audio according to claim 11, wherein the caption data source selector automatically determines the source of caption data by caption style, metadata inserted into the program source, or control signals signaling live program sources.

* * * * *